(12) United States Patent
Gerraty et al.

(10) Patent No.: US 7,398,323 B1
(45) Date of Patent: Jul. 8, 2008

(54) CONFIGURING A NETWORK ROUTER

(75) Inventors: Simon John Gerraty, Mountain View, CA (US); Philip Austin Shafer, Raleigh, NC (US); Robert P Enns, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 1169 days.

(21) Appl. No.: 09/956,400

(22) Filed: Sep. 19, 2001

(51) Int. Cl.
*G06F 15/173* (2006.01)
*G06F 15/16* (2006.01)

(52) U.S. Cl. .................. 709/242; 709/223; 709/246

(58) Field of Classification Search ................ 709/203, 709/208, 210, 221, 217, 220, 228, 238, 242, 709/246, 223
See application file for complete search history.

(56) References Cited

U.S. PATENT DOCUMENTS

| | | | | |
|---|---|---|---|---|
| 5,922,049 A | * | 7/1999 | Radia et al. | 709/220 |
| 5,956,716 A | * | 9/1999 | Kenner et al. | 707/10 |
| 6,073,248 A | * | 6/2000 | Doshi et al. | 714/4 |
| 6,111,673 A | * | 8/2000 | Chang et al. | 398/79 |
| 6,453,354 B1 | * | 9/2002 | Jiang et al. | 709/229 |
| 6,466,982 B1 | * | 10/2002 | Ruberg | 709/227 |
| 6,487,605 B1 | * | 11/2002 | Leung | 709/245 |
| 6,640,278 B1 | * | 10/2003 | Nolan et al. | 711/6 |
| 6,816,891 B1 | * | 11/2004 | Vahalia et al. | 709/214 |
| 6,895,442 B1 | * | 5/2005 | Khanna | 709/245 |
| 6,947,415 B1 | * | 9/2005 | Nagaraj | 370/389 |
| 6,986,157 B1 | * | 1/2006 | Fijolek et al. | 725/111 |
| 2002/0087564 A1 | * | 7/2002 | Khanna et al. | 707/100 |

* cited by examiner

*Primary Examiner*—Ario Etienne
*Assistant Examiner*—Sargon N. Nano
(74) *Attorney, Agent, or Firm*—Shumaker & Sieffert, P.A.

(57) ABSTRACT

An entity, such as a human user or automated program or script, can request an exclusive lock on a router configuration database that prevents other entities from modifying the configuration database until the lock is released. The lock is granted only if no other entity has a lock and the configuration database has not been modified since the last time it was committed. Misconfiguration of the router is thereby prevented.

30 Claims, 3 Drawing Sheets

CONFIGURING A NETWORK ROUTER

TECHNICAL FIELD

The invention relates to computer networks and, more particularly, to configuring routers used in such networks.

BACKGROUND

A computer network is a collection of interconnected computing devices that can exchange data and share resources. In a packet-based network, such as the Internet, the computing devices communicate data by dividing the data into small blocks called packets, which are individually routed across the network from a source device to a destination device. The destination device extracts the data from the packets and assembles the data into its original form. Dividing the data into packets enables the source device to resend only those individual packets that may be lost during transmission.

Devices within the network, often referred to as routers, maintain tables of routing information that describe available routes through the network. A "route" can generally be defined as a unit of information that defines a path between two locations on the network. Upon receiving an incoming data packet, the router examines header information within the packet to identify the destination for the packet. Based on the header information, the router accesses the routing table, selects an appropriate route for the packet and forwards the packet accordingly.

Configuration information for a particular router is typically stored in a configuration database associated with the router. This configuration information may include, by way of example and not limitation, information relating to the configuration of protocols, firewalls, interfaces, the chassis, system parameters, and information relating to accounting, routing policies, and forwarding options. The configuration database can be accessed and manipulated by various entities, such as human users and automated configuration scripts or other programs that manipulate the configuration database without human intervention.

The configuration information that is in effect at any given time is referred to as the current configuration and resides on the router. Users and configuration scripts or programs can modify the configuration information, but, in a commit-based database model, any modifications only become effective when they are committed via a commit operation. This commit-based approach offers some degree of protection from unintended modifications to the configuration information.

Problems may arise when multiple entities attempt to change the configuration without adequate coordination. When only human users try to edit the configuration database at the same time, administrative controls can be used to manage their access. When one or more of the contending entities is an automated script or program, however, coordination may be significantly more difficult to implement because human users are often unaware of the activities of the automated script or program. A lack of adequate coordination can result in a misconfigured system.

Some conventional implementations use a "commit-less model," i.e., a model in which changes to the configuration database are immediate and need not be committed. Because changes take effect immediately, these commit-less implementations are not substantially affected by scripted configuration, thus avoiding some misconfiguration problems. This approach, however, does not offer any sort of multi user access, and the ability to manipulate the router configuration in an automated manner is significantly decreased. For example, automated scripts and programs cannot modify the configuration information if a human user is currently editing the configuration.

SUMMARY OF THE INVENTION

In general, the described invention provides an efficient technique for coordinating access to router configuration information by multiple entities. Some of these entities can be human users, while others can be automated programs or configuration scripts. According to various embodiments consistent with the principles of the invention, the configuration information can be locked in response to a request issued by an entity, provided that no other entity holds an exclusive lock on the configuration information, and no changes have been made to the configuration since the last commit operation. If both of these conditions are satisfied, an exclusive lock is granted to the requesting entity. The lock remains until its owner releases it and prevents other entities from modifying the configuration database.

In one embodiment, the invention is directed to a method in which a router receives a request to exclusively lock configuration information within a router. The configuration information is exclusively locked unless it has already been exclusively locked, or the router configuration database contains changes that have not yet been effected, such as by a database commit command. In another embodiment, a router receives a request to modify router configuration information. The router allows the router configuration information to be modified if it has not been exclusively locked. Other embodiments of the invention include routers configured to manage access to the router configuration information in this manner and computer-readable media for performing these methods.

The above summary of the invention is not intended to describe every embodiment of the invention. The details of one or more embodiments of the invention are set forth in the accompanying drawings and the description below. Other features, objects, and advantages of the invention will be apparent from the description and drawings, and from the claims.

DETAILED DESCRIPTION

In general, the invention facilitates manipulation of router configuration information by multiple entities, such as human users and automated programs and scripts, in a way that prevents misconfiguration problems associated with simultaneous attempts to alter the information. Consistent with the principles of the invention, both human users and automated scripts and programs can access the configuration information in either a read-only mode or a read/write mode. At any time while accessing the configuration information, an entity can request an exclusive lock on the configuration information that prevents other entities from modifying the configuration information until the requesting entity releases the lock. Configuration software executing within the router grants the lock when no other entity has a lock and the configuration information has not been modified since the last time changes were committed. If the lock is granted, all other entities, including those already accessing the configuration information in read/write mode, are switched to read-only access.

Figure 1:
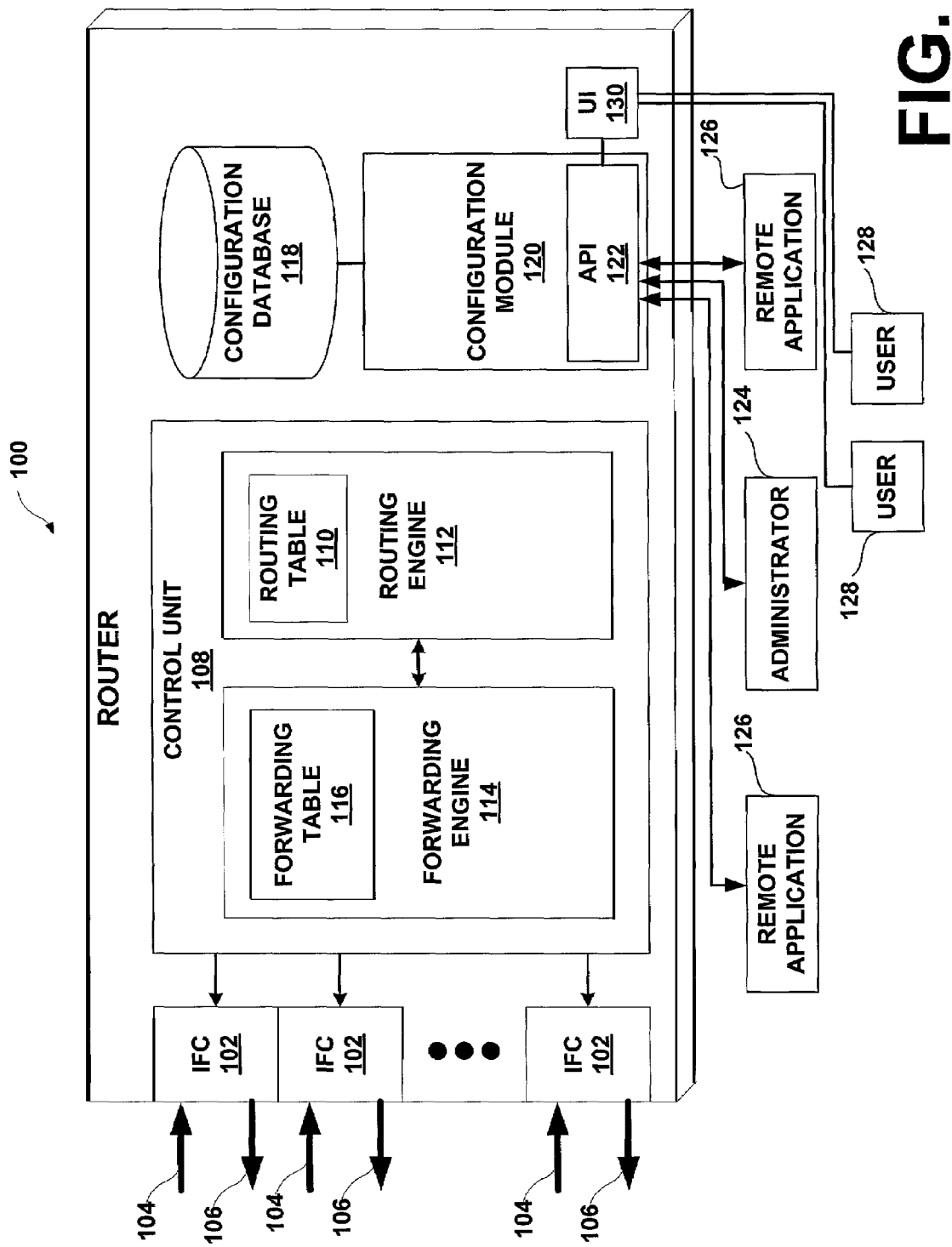
FIG. 1 is a block diagram illustrating an example router consistent with the principles of the invention.

FIG. 1 is a block diagram illustrating an example router 100 configured consistent with the principles of the invention. Router 100 includes one or more interface cards (IFC's) 102 for sending and receiving packets via network links 104 and 106, respectively. Control unit 108 routes inbound packets received from inbound link 104 to the appropriate outbound link 106 in accordance with routing information stored in routing table 110.

In one embodiment, control unit 108 may comprise routing engine 112 and forwarding engine 114. Routing engine 112 maintains routing information within routing table 110. Forwarding engine 114 analyzes routing table 110 prior to receiving packets and pre-selects routes to be used when forwarding packets. Forwarding engine 114 stores the selected routes in forwarding table 116. Upon receiving an inbound packet, forwarding engine 114 examines information within the packet to identify the destination of the packet. Based on the destination, forwarding engine 114 selects an available route and forwards the packet to one of the IFC's 102.

Configuration information 118 includes a variety of configuration information for router 100 including, for example, information relating to the configuration of protocols, firewalls, interfaces, and the chassis, system parameters, and information relating to accounting, routing policies, and forwarding options.

Configuration information 118 may be stored, for example, as a hierarchical database in a flash disk and/or hard disk (not shown) associated with router 100. Alternatively, the configuration information can be stored using other structures, such as a flat file. Accordingly, while certain embodiments of the invention are described in the context of a configuration database, it is to be understood that the principles of the invention are equally applicable to such alternative structures. In one embodiment, router 100 reads an ASCII representation of the configuration from the flash disk upon startup and builds an object database that resides on the hard disk. When router 100 is turned off, the ASCII representation of the configuration is considered the authoritative copy of configuration information 118.

In one embodiment of the invention, configuration module 120 presents application program interface (API) 122 through which other software modules can programmatically access configuration information 118. Remote applications 126, for example, can include programs and/or configuration scripts for accessing configuration information 118. In addition, human users 128, such as system administrators, can interact with user interface (UI) 130 to access configuration information 118.

Router 100 may include, or be used in conjunction with, some form of computer-readable media. By way of example, and not limitation, computer readable media may comprise computer storage media and/or communication media. Computer storage media includes volatile and nonvolatile, removable and nonremovable media implemented in any method or technology for storage of information such as processor-readable instructions, data structures, program modules, or other data. Computer storage media includes, but is not limited to, random access memory (RAM), read-only memory (ROM), EEPROM, flash memory, CD-ROM, digital versatile discs (DVD) or other optical storage, magnetic cassettes, magnetic tape, magnetic disk storage or other magnetic storage devices, or any other medium that can be used to store the desired information and that can be accessed by router 100.

Communication media typically embodies processor readable instructions, data structures, program modules, or other data in a modulated data signal, such as a carrier wave or other transport medium and includes any information delivery media. The term "modulated data signal" means a signal that has one or more of its characteristics set or changed in such a manner as to encode information in the signal. By way of example, and not limitation, communication media includes wired media, such as a wired network or direct-wired connection, and wireless media, such as acoustic, RF, infrared, and other wireless media. Computer readable media may also include combinations of any of the media described above.

Figure 2:
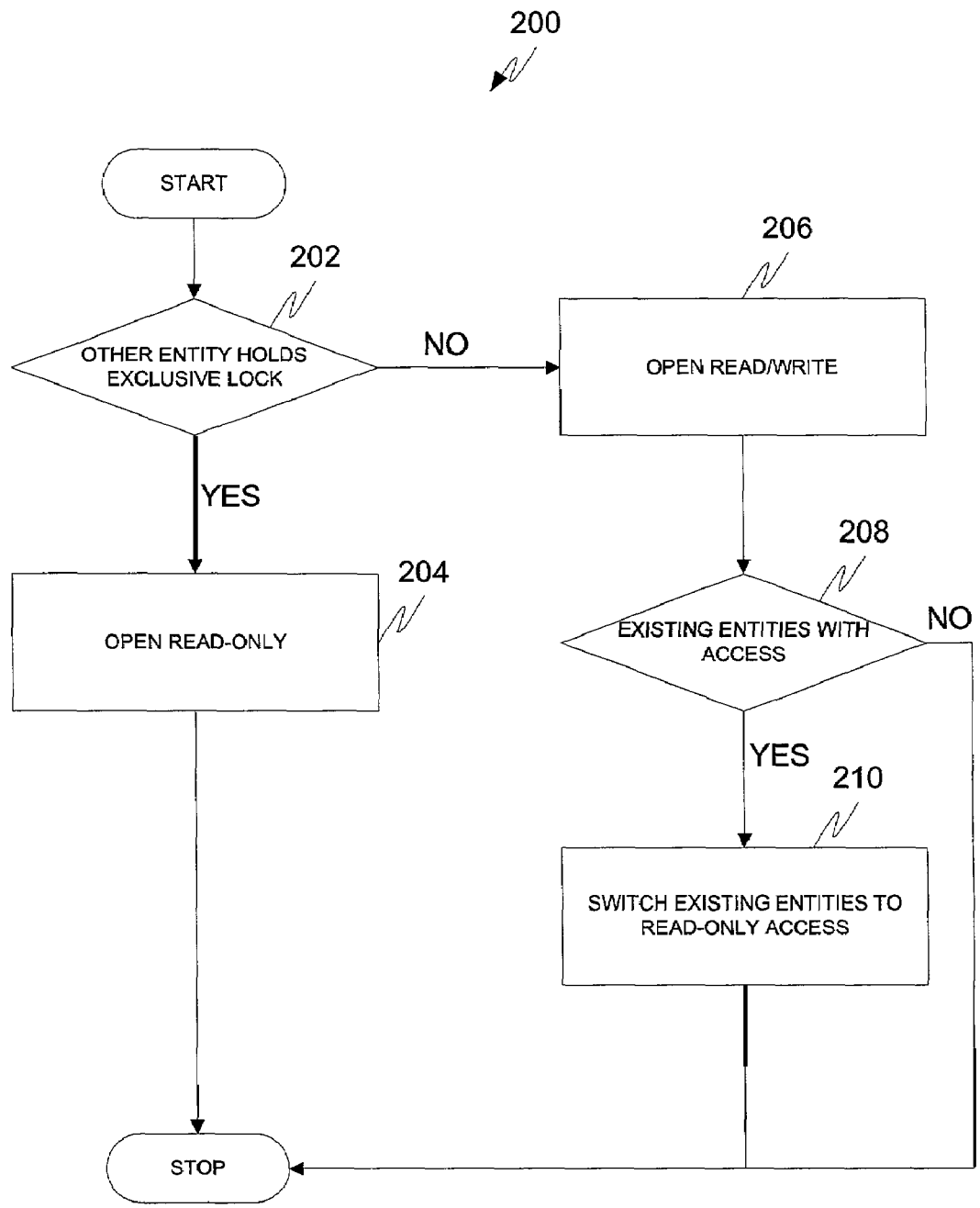
FIGS. 2-3 are flow charts depicting example modes of operation of a configuration module associated with the router of FIG. 1.

FIG. 2 depicts a mode of operation 200 of configuration module 120, in which configuration module 120 grants access to configuration information 118 based on whether an exclusive lock exists. Configuration information 118 grants either a read-only access mode or a read/write access mode based on the determination. First, configuration module 120 determines whether an exclusive lock has been granted to an entity other than the one requesting access to configuration information 118 (202). If another entity does hold an exclusive lock, configuration module 120 opens configuration information 118 in a read-only mode (204). In this mode, the configuration information 118 can be viewed, but cannot be modified. On the other hand, if no other entity holds an exclusive lock on configuration information 118, configuration module 120 opens the configuration information 118 in a read/write mode (206). If an exclusive lock is granted while one or more entities are accessing the configuration information 118 in the read/write mode (208), all entities other than the one to whom the exclusive lock was granted are automatically switched to read-only access (210).

Once configuration information 118 is opened in the read/write mode, the entity holding the exclusive lock can manipulate it in a number of ways. For instance, statements can be merged into the loaded configuration, i.e., the configuration as it is being modified by the entity. This operation is particularly useful when adding a new configuration object or subhierarchy into the configuration. If statements in the loaded configuration conflict with statements in the current configuration, the loaded configuration overrides the current configuration. Alternatively, the current configuration can be discarded and replaced by the loaded configuration, either in whole or in part. A hierarchy level or single configuration object in the current configuration can be replaced by a corresponding hierarchy level or configuration object in the loaded configuration. In addition, a level or object in the current configuration can be deleted, deactivated, or reactivated. Deactivating a level or object prevents it from being activated in the actual configuration when the changes to the configuration are committed, but retains the deactivated level or object in the current configuration. Reactivating a level or object causes the level or object to be activated the next time the changes are committed.

In one embodiment, configuration information 118 can be rolled back to a previous state. Router 100 stores copies of previous configurations. These copies can be used to replace the current configuration with the most recently committed configuration, or with a previously-stored configuration.

After manipulating configuration information 118, the entity can commit the changes so that they become effective on router 100. The configuration must still be opened or locked to be committed. To confirm that the changes have been committed, a confirmation reply is returned to the entity. If, for some reason, the changes cannot be committed, an error is returned instead. Errors typically occur when the configuration contains semantic or syntactic errors. After the changes are committed, configuration information 118 can be closed and unlocked. Unlocking configuration information 118 allows other entities to access and manipulate it. Configuration information 118 can also be unlocked under other circumstances, such as the loss of a connection with an automated script that holds the exclusive lock.

Requiring the entity to commit the changes protects configuration information 118 from some unintentional changes. For example, if an entity that is modifying configuration information 118 experiences an abnormal termination, any changes that were made before the termination are automatically discarded. Accordingly, configuration information 118 is protected from incomplete changes under these circumstances.

It should be noted that mode of operation 200 assumes that a client application has requested opening of configuration information 118 for editing. If the client application instead requests that configuration information 118 be opened for viewing only, configuration information 118 is opened in the read-only mode regardless of whether an exclusive lock is in place.

Figure 3:
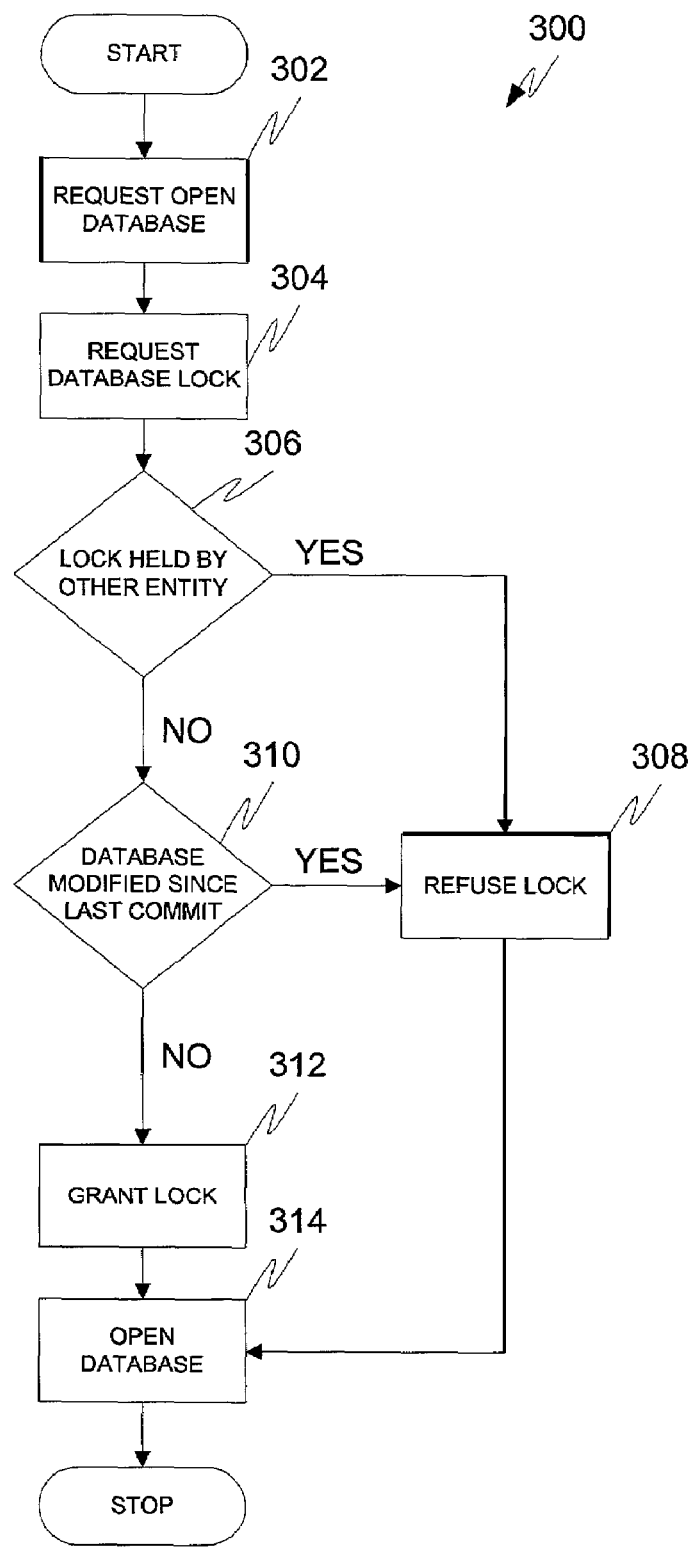

FIG. 3 is a flow chart illustrating another example mode of operation 300 of configuration module 120 of FIG. 1. First, configuration module 120 receives a request to open configuration information 118 from an external entity (302). At that time, configuration module 120 also may receive a request for an exclusive lock from the external entity (304). Alternatively, configuration module 120 can receive a single request to open and lock the current configuration database rather than receiving two separate requests. In either case, the requests may be received, for example, from a system administrator or other human user via user interface 130 of FIG. 1, or from an automated script or program via API 122.

Configuration module 120 then determines whether another entity holds an exclusive lock on configuration information 118 (306), or configuration information 118 has been modified since the last commit operation (310). In one embodiment, configuration information 118 includes a status flag indicating whether the database has been modified since the previous commit command was received. If either condition is true, configuration module 120 denies the request for the exclusive lock (308), and optionally returns an error indication, such as an error tag or message, to the requesting entity. The error indication optionally indicates the reason for refusal of the exclusive lock. If, on the other hand, both conditions are false—that is, if no other entity holds an exclusive lock and configuration information 118 has not been modified since the last commit command was received-configuration module 120 grants the exclusive lock to the requesting entity (312).

In one embodiment consistent with the principles of the invention, a database header within configuration information 118 contains a flag that is set when configuration module 120 grants an exclusive lock. Configuration module 120 checks this flag is checked before any entities can make changes to configuration information 118, even entities that have already gained access to the database. In this way, even entities that have already opened configuration information 118 are transparently switched to a read-only access mode. In another embodiment, configuration module 120 directs an operating system on which router 100 runs to create a lock file that prevents other entities from manipulating configuration information 118. The lock persists until its owner releases it by, for example, emitting a close configuration tag. Regardless of whether the exclusive lock was granted or refused, configuration module 120 opens the database (314), as described more fully above in connection with FIG. 2.

Various embodiments of the invention have been described in which a router can grant an exclusive lock that prevents entities other than the lock holder from modifying the configuration database until the lock is released. The exclusive lock prevents misconfiguration of the router configuration database, thus improving reliability.

It is to be understood that, even though numerous characteristics and advantages of various embodiments of the invention have been set forth in the foregoing description, together with details of the structure and function of various embodiments of the invention, this disclosure is illustrative only, and changes may be made within the principles of the invention to the full extent indicated by the broad general meaning of the terms in which the appended claims are expressed.

The invention claimed is:

1. A method comprising:
   receiving a request from an entity to exclusively lock router configuration information, wherein the configuration information specifies a configuration of one or more communication protocols and one or more network interfaces supported by a network router;
   determining a first condition of whether another entity has already exclusively locked the router configuration information;
   determining a second condition of whether the router configuration information contains changes that have not yet been committed in response to a commit operation; and
   exclusively locking the router configuration information when both the first condition and the second condition are false.

2. The method of claim 1, further comprising dynamically converting any entities currently accessing the router configuration information from a read/write access mode to a read-only access mode when exclusively locking the router configuration information.

3. The method of claim 1, wherein the router configuration information is stored in a router configuration database.

4. The method of claim 3, wherein exclusively locking the router configuration information comprises modifying a database header associated with the router configuration database.

5. The method of claim 1, further comprising determining whether the router configuration information contains changes that have not been committed by detecting a status of a flag associated with the router configuration information.

6. The method of claim 1, further comprising returning an error indicator to an entity requesting the exclusive lock if the router configuration information has already been exclusively locked or the router configuration information contains changes that have not yet been committed.

7. The method of claim 1, wherein the request is received after receiving a request to open the router configuration database.

8. The method of claim 1, further comprising unlocking the router configuration information in response to a request to close the router configuration information.

9. The method of claim 1, further comprising unlocking the router configuration information in response to termination of a connection with an entity that issued the request to exclusively lock the router configuration information.

10. A method, comprising:
    receiving a request to modify router configuration information that specifies forwarding options for network router that forwards packets within a network; and
    allowing the router configuration information to be modified when no exclusive lock is associated with the router configuration information, wherein the exclusive lock is granted in response to a request when (i) no exclusive lock is already associated with the router configuration information when the request is received, and (ii) the router configuration information does not contain changes that have not yet been committed.

11. The method of claim 10, further comprising opening the router configuration information in a read-only mode if an exclusive lock is associated with the router configuration information and the exclusive lock is owned by an entity other than an entity from which the request to modify the router configuration information is received.

12. A router, comprising:
a router configuration database configured to store a configuration of a router that forwards packets within a network, wherein the configuration specifies one or more routing policies for the network router; and
a configuration module to receive a request to exclusively lock the router configuration database, and to exclusively lock the router configuration database when the router configuration database has not already been exclusively locked and when all previous changes to the router configuration database have been committed in response to a database commit command.

13. The router of claim 12, wherein the configuration module is further configured to dynamically convert any entities currently accessing the router configuration database to a read-only access mode.

14. The router of claim 12, wherein the configuration module is further configured to determine whether the router configuration database contains changes that have not been committed by detecting a status of a flag associated with the router configuration database.

15. The router of claim 12, wherein the configuration module is further configured to return an error indicator to an entity requesting that the router configuration database be exclusively locked if the router configuration database has already been exclusively locked or the router configuration database contains changes that have not yet been committed.

16. The router of claim 12, wherein the configuration module is further configured to exclusively lock the router configuration database by modifying a database header associated with the router configuration database.

17. The router of claim 12, wherein the request is received after receiving a request to open the router configuration database.

18. The router of claim 12, wherein the configuration module is further configured to unlock the router configuration database in response to a request to close the router configuration database.

19. The router of claim 12, wherein the configuration module is further configured to unlock the router configuration database in response to termination of a connection with an entity that requested that the router configuration database be exclusively locked.

20. The router of claim 12, wherein the configuration module is further configured to allow modification of the router configuration database if the router configuration database has not been exclusively locked.

21. The router of claim 12, wherein the configuration module is further configured to open the router configuration database in a read-only mode if the router configuration database has already been exclusively locked in response to a request issued by an entity other than an entity from which a request to modify the router configuration database is received.

22. The router of claim 12, wherein the router configuration database is stored as a database of hierarchical router configuration data having a plurality of levels.

23. The router of claim 22, wherein the hierarchical database is stored using at least one of a flash disk and a hard disk.

24. The router of claim 23, wherein an ASCII representation of the hierarchical database is stored using the flash disk.

25. The router of claim 22,
wherein each level has one or more configuration objects, and
wherein an object representation of the hierarchical database is stored using a hard disk.

26. The router of claim 12, further comprising a control module configured to route packets according to information in a routing table and according to information in the router configuration database.

27. A computer-readable medium having stored thereon computer-executable instructions for:
receiving a request to modify router configuration information that specifies a configuration of one or more communication protocols supported by a network router; and
allowing the router configuration information to be modified when no exclusive lock is associated with the router configuration information, wherein the exclusive lock is granted in response to a request when (i) no exclusive lock is already associated with the router configuration information when the request is received, and (ii) the router configuration information does not contain changes that have not yet been committed.

28. The computer-readable medium of claim 27, further comprising computer-executable instructions for opening the router configuration information in a read-only mode if an exclusive lock is associated with the router configuration information and the exclusive lock is owned by an entity other than an entity from which the request to modify the router configuration information is received.

29. A router comprising:
a plurality of interface cards for communicating with a packet-based network;
a routing table storing routing information that describe available routes through the network;
a control module configured to forward packets according to the routing information;
a router configuration database configured to store configuration data for the router, wherein the router configuration database operates in accordance with a commit-based model responsive to commit commands; and
a configuration module to receive a request to exclusively lock the router configuration database, wherein the configuration module exclusively locks the router configuration database in response to the request unless the router configuration database has already been exclusively locked or the router configuration database contains changes that have not yet been committed by a commit command.

30. A router comprising:
a plurality of interface cards for communicating with a packet-based network;
a routing table storing routing information that describe available routes through the network;
a control module configured to forward packets in accordance with the routing information;
a router configuration database configured to store configuration data for the router; and
a configuration module that provides concurrent access to the router configuration database for a plurality of users and allows the users to change the configuration database and issue commit commands to commit the changes, wherein the configuration module receives a request to exclusively lock the router configuration database from one of the users, and wherein the configuration module exclusively locks the router configuration database in response to the request when the router configuration database is not already exclusively locked by another user and the router configuration database contains no uncommitted changes.

* * * * *

UNITED STATES PATENT AND TRADEMARK OFFICE
CERTIFICATE OF CORRECTION

| | | |
|---|---|---|
| PATENT NO. | : 7,398,323 B1 | Page 1 of 1 |
| APPLICATION NO. | : 09/956400 | |
| DATED | : July 8, 2008 | |
| INVENTOR(S) | : Gerraty et al. | |

It is certified that error appears in the above-identified patent and that said Letters Patent is hereby corrected as shown below:

Column 8, line 41 (Claim 29), "information that describe" should read -- information that describes --

Column 8, line 60 (Claim 30), "information that describe" should read -- information that describes --

Signed and Sealed this

Fifth Day of October, 2010

David J. Kappos
*Director of the United States Patent and Trademark Office*